United States Patent [19]

Hocker et al.

[11] Patent Number: 4,488,987

[45] Date of Patent: Dec. 18, 1984

[54] DOPED POLYMERIC ORGANIC ELECTRICAL CONDUCTORS AND A PROCESS FOR THEIR MANUFACTURE

[75] Inventors: Jürgen Hocker, Bergisch-Gladbach; Rolf Dhein, Krefeld; Rudolf Merten, Leverkusen, all of Fed. Rep. of Germany

[73] Assignee: Bayer Aktiengesellschaft, Leverkusen

[21] Appl. No.: 443,202

[22] Filed: Nov. 22, 1982

[30] Foreign Application Priority Data

Dec. 1, 1981 [DE] Fed. Rep. of Germany ....... 3147476

[51] Int. Cl.³ .............................................. H01B 1/06
[52] U.S. Cl. .................................... 252/520; 252/518; 524/401; 524/413; 524/434; 528/485; 528/490; 525/370

[58] Field of Search ..................... 252/520, 518, 501.1; 526/285; 524/174, 175, 176, 178, 401, 413, 434; 528/485, 490; 525/370, 355

[56] References Cited

U.S. PATENT DOCUMENTS

| | | | |
|---|---|---|---|
| 4,228,060 | 10/1980 | Peg ...................................... | 526/285 |
| 4,394,304 | 7/1983 | Wnek .................................. | 252/518 |
| 4,410,640 | 10/1983 | Kobayashi et al. ................. | 252/500 |
| 4,440,669 | 4/1984 | Ivory et al. ......................... | 252/518 |

OTHER PUBLICATIONS

Shirakawa et al., J.C.S. Chem. Comm. 1977, pp. 578-580.

Primary Examiner—Josephine L. Barr
Attorney, Agent, or Firm—Connolly and Hutz

[57] ABSTRACT

Increasing the electrical conductivity of conjugated polymers by partial oxidation (doping) with a compound of tetravalent titanium or tetravalent tin.

2 Claims, 1 Drawing Figure

DOPED POLYMERIC ORGANIC ELECTRICAL CONDUCTORS AND A PROCESS FOR THEIR MANUFACTURE

This invention relates to polymeric electrical conductors which are oxidised in a novel way, to a process for their production and to their use as electrical conductors, semiconductors or photoconductors.

Conjugated organic polymers, such as polyacetylene, polyparaphenylene, polyparaphenylene sulphide, polypyrrole, polythiophene or substitution products thereof, exhibit specific electrical conductivities of from $10^{-16}$ to $10^{-5} \Omega^{-1}$ cm$^{-1}$ and are thus electrical insulators or semiconductors [Makromol. Chem., Vol. 175, 1565 (1978)].

However, electrical conductivity may be considerably increased by partial oxidation. If gaseous $Cl_2$, $Br_2$, $I_2$, ICl, IBr, $AsF_5$ or $SbF_5$ is allowed to act, for example, on a polyacetylene film, the conductivity increases up to $\sim 10^{+3} \Omega^{-1}$ cm$^{-1}$ [J. Amer. Chem. Soc., Vol. 100, 1013 (1978)].

Oxidation with $AgBF_4$ or $AgClO_4$ has also been proposed (J. Chem. Soc., Chem. Comm. 1978, 489). European Patent No. 0,022,271 describes the use of metal complexes of the platinum group, carbonium salts, oxonium salts, or parabenzoquinone derivatives to increase the electrical conductivity of polyacetylene.

The best conductivities are obtained using $I_2$ or $AsF_5$.

Most of the agents known hitherto for increasing the electrical conductivity are either not readily accessible, toxic, corrosive, difficult to handle, sensitive to hydrolysis or readily volatile.

An object of the present invention is to provide easily accessible, and difficultly volatile substances of low toxicity which increase the electrical conductivity of conjugated organic polymers.

It has now been found that the electrical conductivity of conjugated organic polymers can be increased considerably when they are oxidised with salts of tetravalent titanium or tin.

Thus, the present invention provides organic polymers, such as polyacetylene, polyparaphenylene, polyparaphenylene sulphide, polypyrrole or polythiophene, the conductivity of which has been increased by oxidation ("doping") using difficultly volatile compounds such as salts of tetravalent titanium or tin, a process for the production of these partially oxidised polymers, and the use thereof as electrical conductors, semiconductors or photoconductors.

The following inter alia, are included as suitable salts: $TiF_4$, $Na_2TiF_6$, Titanium(IV)ethoxide, titanium(IV) acetylacetonate, tin(IV) acetylacetonate, methyltin trichloride, dimethyltin dichloride, and tetrakis-dimethylamino-tin.

The halides of tetravalent titanium and tin, in particular $TiCl_4$ and $SnCl_4$, are particularly preferred.

The salts may optionally contain water of crystallisation.

Furthermore, those salts of tetravalent titanium and tin which are soluble in an organic solvent or readily sublimable are particularly suitable.

The salts are generally added in quantities of from 0.1 to 200% by weight, preferably from 10 to 120% by weight and in particular from 20 to 100% by weight, based on the polymer.

Doping the polyacetylene with halides of tetravalent titanium or tin is particularly preferred.

The salts which are used according to the present invention increase the conductivity of, for example, polyacetylenes which are produced according to all conventional processes. Suitable catalyst systems for the polymerisation of acetylene include, in particular, Ziegler-Natta catalysts [Polymer Journal, 2, 231 (1971)] and Luttinger catalysts [J. Org. Chem. 27, 1591 (1962)]. A particularly preferred catalyst system consists of from 0.05 to 0.2 mols of a vanadium compound I:

wherein
$R^1$ represents halogen (chlorine), and
$R^2$ and $R^3$, which may be the same or different, represent halogen (chlorine) or $OR^5$ ($R^5 = C_1$–$C_{20}$ alkyl), and from 0.1 to 4.0 mols of a trialkyl aluminium.

The organic polymers are preferably oxidised in an organic or inorganic solvent. Polar organic solvents are suitable, for example methanol, ethanol, propanol, i-propanol, acetonitrile, acetone, dimethylformamide, N-methylpyrrolidone, sulpholane, hexamethylphosphoric acid trisamide, propylene carbonate, nitromethane.

Water or a mixture of water with a water-miscible organic solvent is also suitable. Since the organic polymers of the present invention are insoluble in all conventional solvents, oxidation is carried out in suspension.

As an exception, oxidation may also be carried out in the gas phase, if the oxidising agent is sublimable.

Oxidation may be carried out at from $-80°$ to $+200°$ C., preferably from $-40°$ to $+80°$ C. The reaction is particularly appropriate at room temperature.

The polymer used for oxidation may be a fine powder, or in the form of a film or a gel.

The oxidation of polyacetylene particles is particularly preferred in the form of particles of a diameter of from 0.01 to 1 mm having a plurality of fibrous extensions ("burrs") which are obtained by introducing acetylene into an organic suspending agent with continuous and thorough mixing in the presence of an organometallic mixed catalyst in a quantity corresponding to from 10 to 100 mmol of aluminium and to from 5 to 50 mmol of titanium tetrabutylate or from 1 to 10 mmol of bis-(2,2-dimethylpropoxy)-vanadiumoxychloride per liter of suspending agent, until about 3 g of polyacetylene have formed per liter of suspending agent.

"Burr"-shaped polyacetylene is shown in FIG. 1.

The extent of oxidation ("doping") may be controlled by the quantity of oxidising agent which is used, by the duration of action and by the temperature. Thus, it is possible to control the conductivity of the partially oxidised polymers between $10^{-8}$ and $10^{+2} \Omega^{-1}$ cm$^{-1}$.

Oxidation ("doping") is optionally carried out in an inert gas atmosphere in order to prevent the oxidation of oxygen-sensitive polymers by atmospheric oxygen.

The products according to the present invention may be used as electrical conductors, semiconductors or photoconductors and for damping electromagnetic radiation.

The oxidised polymers of the present invention may be used as such and may also be added to another polymer as a "filler", thus improving the electrical properties thereof.

Thus, plastics materials, lacquers, films or fibres, for example, may be provided with a permanent anti-static property by adding the products of the present invention.

The products of the present invention as such may be used as, for example, an electrode material in batteries or as a component of photovoltaic transducers.

Practical Examples

EXAMPLE 1

A strip of a polyacetylene film produced according to Shirakawa [Polym. J. 4, 460 (1973)] which weighs 323 mg and has a specific conductivity of $2.7 \times 10^{-7} \Omega^{-1}$ cm$^{-1}$ was introduced into a solution of 2 ml of SnCl$_4$ in 50 ml of methylene chloride for 24 hours under nitrogen. After being washed with a little methylene chloride, the film was dried under vacuum. It weighed 401 mg and had a specific conductivity of $2.3 \times 10^{-1} \Omega^{-1}$ cm$^{-1}$ (measured as a pellet at 1937 Kp/cm$^2$).

EXAMPLES 2 TO 5

Polyacetylene films were exposed to the doping additive SnCl$_4$ for different periods of time analogously to Example 1:

| | Time (Hours) | Weight in mg Before doping | After doping | Conductivity [$\Omega^{-1}$ cm$^{-1}$] |
|---|---|---|---|---|
| Example No. 2 | 48 | 345 | 401 | $7.6 \times 10^{-2}$ |
| Example No. 3 | 70.5 | 306 | 356 | $1.4 \times 10^{-1}$ |
| Example No. 4 | 94.5 | 345 | 420 | $2.6 \times 10^{-1}$ |
| Example No. 5 | 118.5 | 313 | 388 | $3.1 \times 10^{-1}$ |

EXAMPLE 6

5 ml of SnCl$_4$ are added at room temperature to a suspension containing 1.20 g of minute polyacetylene particles in "crab" form in 100 ml of toluene, and the mixture is stirred for 10 hours under nitrogen. After filtration, a doped polyacetylene film is produced which weighs 1.57 g and has a specific conductivity of $3.7 \times 10^{-1} \Omega^{-1}$ cm$^{-1}$ (two-electrode measurement at 1900 Kp/cm$^2$).

EXAMPLE 7

Analogously to Example 6, a doped polyacetylene film weighing 1.31 g and having a specific conductivity of $4.1 \times 10^{-1} \Omega^{-1}$ cm$^{-1}$ is obtained by doping a suspension containing 0.94 g of polyacetylene fibres in 100 ml of methylene chloride.

EXAMPLE 8

A polyacetylene film produced according to Shirakawa [Polym. J. 4, 460 (1973)] which weighs 360 mg and has a specific conductivity of $2.7 \times 10^{-7} \Omega^{-1}$ cm$^{-1}$ is treated with a solution of 2 ml of TiCl$_4$ in 50 ml of methylene chloride for 24 hours under nitrogen. After drying, a film weighing 438 mg is obtained which has a specific conductivity of $2.3 \times 10^{-1} \Omega^{-1}$ cm$^{-1}$ (two-electrode measurement at 1900 Kp/cm$^2$).

EXAMPLE 9

6 ml of TiCl$_4$ are added at room temperature to a suspension containing 920 mg of minute polyacetylene particles in "burr" form in 100 ml of toluene and the mixture is subsequently stirred for 20 hours under nitrogen. After filtration, a film is obtained which weighs 1.32 g and has a specific conductivity of $6.7 \times 10^{-1} \Omega^{-1}$ cm$^{-1}$ (two-electrode measurement at 1920 Kp/cm$^2$).

EXAMPLE 10

300 mg of polyparaphenylene powder are stirred for 36 hours in a solution of 2 ml of SnCl$_4$ in 50 ml of methylene chloride. After suction filtering and drying, 412 mg of a black powder are obtained having a specific conductivity of $3.5 \times 10^{-5} \Omega^{-1}$ cm$^{-1}$.

EXAMPLE 11

If the reaction is carried out analogously to Example 10 using TiCl$_4$, a powder is obtained which has a specific conductivity of $1.6 \times 10^{-4} \Omega^{-1}$ cm$^{-1}$.

We claim:

1. A process for increasing the electrical conductivity in a conjugated organic polymer selected from the group consisting of polyacetylene, polyphenylene, polyphenylene sulphide, polypyrrole and polythiophene which comprises oxidizing said conjugated organic polymer with a salt of tetravalent titanium or tin which is soluble in an organic solvent or readily sublimable and is present in an amount of from 0.1 to 200% by weight, based on said conjugated organic polymer, at a temperature of $-80°$ to $200°$ C.

2. A process of claim 1, wherein said conjugated organic polymer is suspended in a liquid selected from the group consisting of methanol, ethanol, propanol, i-propanol, acetonitrile, acetone, dimethylformamide, N-methylpyrrolidone, sulphone, hexamethylphosphoric acid trisamide, propylene carbonate and nitromethane.

* * * * *